United States Patent Office 3,375,287
Patented Mar. 26, 1968

3,375,287
PROCESS FOR ISOMERIZING ETHYLENICALLY UNSATURATED COMPOUND POSSESSING CYCLOALIPHATIC NUCLEUS
Samuel W. Tinsley, Edward A. Rick, and James E. McKeon, Charleston, W. Va., assignors to Union Carbide Corporation, a corporation of New York
No Drawing. Continuation of application Ser. No. 396,416, Sept. 14, 1964. This application July 21, 1967, Ser. No. 655,239
23 Claims. (Cl. 260—666)

ABSTRACT OF THE DISCLOSURE

This invention relates to the isomerization of an ethylenically unsaturated compound which contains a cycloaliphatic nucleus.

---

This application is a continuation of Ser. No. 396,416 filed Sept. 14, 1964, now abandoned, which in turn was a continuation-in-part of Ser. No. 134,846, filed Aug. 30, 1961, now abandoned.

Various processes are available for isomerizing olefins; however, such processes are, in general, limited in scope and in addition, suffer from one or more limitations such as unfavorable equilibrium conditions, excessive cracking of the olefinic reagent, undesirable polymerization of the olefinic reagent, and the like.

In a broad aspect, the present invention is directed to a process for isomerizing an isomerizable ethylenically unsaturated compound having a cycloaliphatic nucleus in the presence of a catalyst, said catalyst being described hereinafter in detail. It becomes apparent, therefore, that the practice of the novel process affords a convenient means for obtaining various ethylenically unsaturated monomers which are not readily commercially available or which can only be prepared by more expensive and time consuming prior art routes. For instance, the operative examples contained in this specification disclose the isomerization of non-conjugated diolefinic compounds such as 4-vinylcyclohexene and 1,5-cyclooctadiene to conjugated diolefinic products namely, 1-ethyl-1,3-cyclohexadiene and 1,3-cyclooctadiene, respectively. The isomerized products which are obtained in accordance with the practice of the novel process possess, of course, utility as reagents in the preparation of alcohols, ketones, acids, amines, epoxides, and various other derivatives. In addition, the isomerized products can be employed as the diene or, in some instances, the dienophile in the well-known Diels-Alder reaction, or as a monomeric source in the preparation of useful polymers. The literature very adequately describes numerous routes which utilize the isomerized products.

The ethylenically unsaturated compounds which can be employed in the process of this invention typically are composed solely of carbon and hydrogen, a cycloaliphatic nucleus having up to 16 carbon atoms in said nucleus, preferably up to 12 carbon atoms in said nucleus, and at least one migratable ethylenic bond. By the term "migratable ethylenic bond," as used herein including the appended claims, is meant an ethylenic bond, i.e.

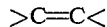

which is bonded in the compound to a carbon atom in the alpha (α) position to the ethylenic bond, which alpha carbon atom bears at least one hydrogen atom. The ethylenic unsaturated compounds most favorably employed herein contain at least one migratable ethylenic bond which is an isomerizable ethylenic bond, i.e.

By the term "isomerizable ethylenic bond," as used herein including the appended claims, is meant an ethylenic bond, i.e., >C=C<, which is not present in its most thermodynamically favored position in the ethylenically unsaturated molecule. Similarly, compounds containing one or more migratable ethylenic bonds (or the more specific isomerizable ethylenic bonds) are referred to herein, including the appended claims, as "isomerizable" compounds. The ethylenically unsaturated compounds which are contemplated include, for instance, the isomerizable cycloolefinic hydrocarbons which contain 2 to 3 ethylenic bonds such as the isomerizable cyclodiolefins and the isomerizable cyclotriolefins, e.g., 1,4-cyclohexadiene, 1,4-cycloheptadiene, 1,5-cyclooctadiene, 1,4-cyclooctadiene, the isomerizable cyclononadienes, the isomerizable cyclodecadienes, the isomerizable cyclododecadienes, the isomerizable cyclohexadecadienes, 1,3,6-cyclooctatriene, the isomerizable cyclodecatrienes, the isomerizable cyclododecatrienes, the isomerizable cyclohexadecatrienes, and the like; the isomerizable alkyl substituted cycloolefinic hydrocarbons which contain from 1 to 3 ethylenic bonds, preferably the isomerizable lower alkyl substituted cycloolefinic hydrocarbons, e.g., the isomerizable alkylcyclopentenes, 3-methylcyclopentene, 4-methylcyclopentene, 3,4-dimethylcyclopentene, 4-ethylcyclopentene, the isomerizable alkylcyclohexenes, 4-methylcyclohexene, 4-n-butylcyclohexene, the isomerizable alkylcycloheptenes, 3-isopropylcycloheptene, the isomerizable alkylcyclooctenes, 5-methylcyclooctene, the isomerizable dimethylcyclooctenes, the isomerizable alkylcyclodecenes, 3-ethylcyclodecene, the isomerizable alkylcyclododecenes, the isomerizable alkylcyclohexadienes, 1-propyl-1,4-cyclohexadiene, the isomerizable alkylcycloheptadienes, the isomerizable alkylcyclooctadienes, the methyl-1,5-cyclooctadienes, the dimethyl-1,5-cyclooctadienes, the isomerizable alkylcyclodecadienes, the trimethyl-1,5-cyclododecadienes, the isomerizable alkylcyclooctatrienes, the methylcyclooctatrienes, the isomerizable alkylcyclodecatrienes, the isomerizable methylcyclodecatrienes, the isomerizable alkylcyclododecatrienes, the trimethyl-1,5,9-cyclododecatrienes, and the like; the isomerizable vinyl substituted cycloolefinic hydrocarbons which contain from 1 to 3 ethylenic bonds, e.g., 4-vinylcyclohexene, the methyl-4-vinylcyclohexenes, 4 - isopropenylcyclohexene, and the like; the isomerizable vinyl substituted cycloalkanes, e.g. vinylcyclopentane, vinylcyclohexane, vinylcycloheptane, vinylcyclooctane, 2-methylenebicyclo[2.2.1]- heptane, 2-methylbicyclo[2.2.1]hept-2-ene, and the like.

To illustrate this, separate samples of 2-methylenebicyclo[2.2.1]heptane and 2-methylbicyclo[2.2.1]hept-2-ene were each sealed in glass tubes with bis-benzonitrile palladium (II) chloride and heated for varying periods of time. The reaction products were analyzed by vapor phase chromatography. The following tables show the results of these experiments:

TABLE I.—ISOMERIZATION OF 5 MILLILITERS OF 2-METHYLENEBICYCLO[2.2.1]HEPTANE

| Exp. No. | Milligrams PdCl₂.2φCN employed as catalyst | Temp. (° C.) | Time (hrs.) | Mole percent 2-methylbicyclo[2.2.1]- hept-2-ene | Mole percent 2-methylenebicyclo[2.2.1]- heptane |
|---|---|---|---|---|---|
| 1 | 50 | 130 | 2 | 12.2 | 87.8 |
| 2 | 50 | 130 | 4 | 12.4 | 87.6 |
| 3 | 50 | 130 | 8 | 12.7 | 87.3 |
| 4 | 100 | 130 | 8 | 12.9 | 87.1 |
| 5 | 50 | 100 | 8 | 12.4 | 87.6 |
| 6 | 50 | 100 | 8 | 12.3 | 87.7 |

TABLE II.—ISOMERIZATION OF 3 MILLILITERS OF 2-METH-YLBICYCLO[2.2.1]HEPT-2-ENE

| Exp. No. | Milligrams PdCl$_2$.2$\phi$CN employed as catalyst | Temp. (° C.) | Time (hrs.) | Mole percent 2-methylbi-cyclo[2.2.1]-hept-2-ene | Mole percent 2-methylene-bicyclo[2.2.1]-heptane |
| --- | --- | --- | --- | --- | --- |
| 1 | 30 | 130 | 8 | 12.6 | 86.4 |
| 2 | 30 | 130 | 8 | 12.5 | 86.5 |
| 3 | 30 | 100 | 8 | 13.0 | 87.0 |
| 4 | 30 | 100 | 8 | 12.9 | 87.1 |

The above experiments illustrate that an equilibrium in the isomerization reaction can exist tending to favor the more stable isomeric form. However, there are instances where isomerization results in essentially complete conversion to the more stable isomeric form—at least in such cases the relatively unstable isomeric form is not detectable. Either one of the isomeric forms resulting in the equilibrium mixture may be withdrawn from the reaction equilibrium products and so long as the products are maintained in the presence of isomerization catalyst, more product is produced. Thus, if in the above case, 2-methylbicyclo[2.2.1]hept-2-ene is isolated from the reaction mixture, e.g., by distillation, equilibrium will be continually reestablished upon removal of the isomeric specie and more 2-methylbicyclo[2.2.1]hept-2-ene will be produced. As a result, yields of this specie far in excess of the 12 to 13 mole percent indicated above in the equilibrium mixture is obtainable from a given amount of starting material. In this manner, it is possible to obtain appreciable high yields of any one of the isomeric products obtained from the isomerization process of this invention. For example, in the isomerization indicated in Table II above, if the lower boiling 2-methylbicyclo[2.2.1]hept-2-ene is distilled and the distilled product is contacted with additional catalyst, it can be isomerized to form an equilibrium mixture thus producing substantially greater yields of the more stable isomeric form, to wit, 2-methylenebicyclo[2.2.1]heptane.

The process of this invention favors the isomerization of an ethylenically unsaturated compound containing isomerizable ethylenic bonds. This is evident from analysis of the isomerization reaction products which typically contain an equilibrium mixture of the favored and predominant product as well as some of the less favored isomeric starting material. By upsetting the equilibrium of the isomerization reaction, i.e., by withdrawing some or all of the more thermodynamically favored product, greater yield of such product is obtainable.

In the isomeric conversion of a more thermodynamically favored isomerizable product containing migratable ethylenic bonds, utilizing the process conditions taught herein, there is formed also an equilibrium mixture of the isomeric mixture, i.e., a mixture of the thermodynamically favored isomer and the less thermodynamically favored isomer(s). By withdrawing the less favored isomer from the mixture, by, e.g., distillation, equilibrium is reestablished and more of the less favored isomer is produced. Thus high yields of such product are attainable.

The catalysts which are contemplated are those transition metal ions and atoms which are capable of forming d.sp.$^2$ (square planar) hybrid orbitals. By "transition metals" as used herein is meant those elements of the periodic system which are characterized by atoms in which an inner d. level of electrons is present but not filled to capacity. With the exception of the nickel series (Ni, Pd, and Pt) and the cobalt series (Co, Rh, and Ir), these transition metal catalysts can possess a neutral charge or a positive charge, and they include those elements which have an atomic number ranging from 22 to 28, inclusive, from 40 to 46, inclusive, and from 72 to 78, inclusive. Alternatively, the transition metals which are contemplated include the Group IVB, VB, VIB, VIIB, and VIII elements of the periodic chart.[1] Specifically, these transition metal catalysts are $Ni^{+2}$, $Pd^{+2}$, $Pt^{+2,+4}$, $Co^{+1,+2}$, $Rh^{+1,+2,+3}$, $Ir^{+1,+2}$, $Fe^{0,+1,+2,+3}$, $Ru^{0,+1,+2,+3}$, $Os^{0,+1,+2,+3}$, $Mn^{0,+1,+2}$, $Tc^{0,+1,+2}$, $Re^{0,+1,+2}$, $Cr^{0,+1,+2,+3}$, $Mo^{0,+1,+2,+3}$, $W^{0,+1,+2,+3}$, $V^{0,+1,+2,+3,+4,+5}$, $Nb^{0,+1,+2,+3,+4,+5}$, $Ta^{0,+1,+2,+3,+4,+5}$, $Ti^{0,+1,+2,+3,+4}$, $Zr^{0,+1,+2,+3,+4}$ and $Hf^{0,+1,+2,+3,+4}$. The preferred metals are those from the Group VIII nickel series (Ni, Pd, and Pt), the Group VIII cobalt series (Co, Rh, and Ir), and the Group VIII iron series (Fe, Ru, and Os). It is pointed out that the essential catalytic entity is the transition metal in one of the oxidation states illustrated supra which thus is capable of forming d.sp.$^2$ hybrid orbitals. A wide variety of compounds which contain the transition metal in its proper oxidation state can be employed to furnish the active catalyst species providing said compounds form a homogeneous phase with the reaction medium under the operative conditions of the process. A co-solvent inert with respect to the isomerizable reagent, may be employed to bring about the required homogeneity. The moieties which can be bonded to the transition metal in order to form a neutral compound (which provides the catalytic species when added to the reaction medium) can be selected from a large group of ions and neutral ligands. Illustrative of the charged moieties include, for instance, the halide ions; the hydride ion; the carbanions, e.g., alkyl anion, phenyl anion, and the like; the cyclopentadienylide anions; the $\pi$-allyl groupings; the enolates such as the enolates of beta-dicarbonyl compounds, e.g., acetylacetonates and the like; the anions of acidic oxides of carbon (carboxylate, carbonate, etc.), nitrogen (nitrate, nitrite, etc.), phosphorus (phosphate, phosphite, etc.), bismuth (bismuthate, etc.), aluminum (aluminate, etc.), silicon (silicate, etc.), sulfur (sulfate, sulfite, etc.), molybdenum (molydates, etc.), and the like, in which one valence of the central atom of the acidic oxide may be attached to carbon, and/or in which one of the oxygen atoms may be attached to carbon; and the like; protons and other positive ions, e.g., $Na^+$, $K^+$, $Ca^{++}$, and the like. In addition, exemplary neutral moieties which are contemplated include, among others, the olefins; the acetylenes; the acetylenic olefins; the aromatic compounds, e.g., benzene, diphenyl, and the like; carbon monoxide; nitric oxide; the basic nitrogen compounds, e.g., ammonia, the anilines pyridines, dipyridines, amines, imines, amides, imides, ureas, oximes, nitriles, hydroxamic acids, amino acids, and the like; the organic ethers, e.g., dimethyl ether of diethylene glycol, dioxane, tetrahydrofuran, furan, diallyl ether, and the like; the phosphines, e.g., phosphine, the alkylphosphines, the arylphosphines, the alkarylphosphines, and the like, and analogous compounds of antimony, arsenic, and bismuth; the phosphites, e.g., the alkyl-, aryl-, alkarylphosphites, and the like; the phosphine oxides; the phosphorous halides; the phosphorous oxyhalides; the sulfides, e.g., the alkyl-, aryl-, alkarylsulfides, and the like; the cyclic sulfides; the unsaturated sulfides, the sulfoxides, e.g., aryl-, alkyl-, alkarylsulfoxides, and the like.

Specific compounds which can be employed to provide the catalyst species include, for example, $Fe_3(CO)_{12}$, $Fe(NO)_2(CH_3CN)_2$, $C_8H_8Fe(CO)_3$, $C_5H_5Co(CO)_2$ $(\phi_3P)_2NiBr_2$, $(C_5H_5)_2Ru$, $C_5H_5RhC_5H_6$, $(C_5H_5)_2Os$, $C_5H_5IrC_5H_6$, $K_2PtCl_4$, $Mn(NO)_3(CO)$, $C_5H_5Mn(CO)_3$, $C_5H_5Mn(C_2H_4)(CO)_2$, $ReCl(\phi—C\equiv CH)_2$ $C_5H_5V(CO)_4$, $V(CO)_6$, $VCl_4 \cdot CH_3CN$,

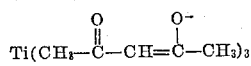

dimethylpiperazine palladous chloride, cyclopropane platinous chloride, indene chromium(O) tricarbonyl, fluorene chromium(O) tricarbonyl, $\pi$-allyl-$\pi$-cyclopentadienylpalladium, and the like.[2]

---

[1] Periodic Chart of the Elements, by the Fisher Scientific Company, New York, copyright 1957.

[2] In the above formulas C$_8$H$_8$ is cyclooctatraene; C$_5$H$_5$ is cyclopentadienyl anion; C$_2$H$_4$ is ethylene; $\phi$ is the phenyl radical; C$_5$H$_6$ is cyclopentadiene.

The preparation of typical compounds capable of supplying the catalyst species is documented in the literature.[3]

The catalysts are employed in catalytically significant quantities. In general, a catalyst concentration in the range of from about 0.001, and lower, to about 10, and higher, weight percent, based on the weight of the ethylenic reagent, is suitable. A catalyst concentration in the range of from about 0.005 to about 8.0 weight percent is preferred. A catalyst concentration in the range of from about 0.01 to about 5 weight percent is highly preferred. For optimum results, the particular catalyst employed, the nature of the ethylenic reagent, the operative conditions under which the isomerization reaction is conducted, and other factors will largely determine the desired catalyst concentration. It is highly desirable that the catalyst be soluble in or miscible with the ethylenic reagent.

The isomerization reaction can be conducted over a wide temperature range and generally at an elevated temperature. Depending upon various factors such as the nature of the ethylenic reagent employed, the particular catalyst employed, the concentration of the catalyst, and the like, the reaction temperature can be as low as 0° C., and lower, and as high as 350° C., and higher. A suitable temperature range is from about 25° C. to about 225° C. A reaction temperature in the range of from about 40° C. to about 200° C. is preferred.

The isomerization reaction preferably occurs in the liquid phase, and to this extent sufficient pressure is employed to maintain an essentially liquid reaction mixture regardless whether or not an inert normally-liquid organic vehicle is employed.

In general, the reaction time will vary depending on the operative temperature, the nature of the ethylenic reagent employed, the particular catalyst and the concentration employed, and other factors. In view of the illustrative variable noted above, the reaction is conducted for a period of time sufficient to produce a shift in the position of the double bond of the isomerizable reagent. It has been observed that desirable results can be obtained by conducting the reaction for a period of time ranging from several minutes to several hours, or longer. In general, a reaction time of from about 0.5 hour, and lower, to about 24 hours, and higher, is suitable.

The process of the invention can be executed in a batch, semi-continuous, or continuous fashion. The reaction vessel can be a glass vessel, steel autoclave, elongated metallic tube, or other equipment and material employed in the isomerization art provided that the catalyst-containing compound is not sensitive to this material of construction. The order of addition of catalyst and ethylenic reagent does not appear to be critical. A suitable procedure is to add the catalyst to the reaction zone containing the ethylenic reagent. If desired, the catalyst can be in solution or suspension (e.g., in an inert normally-liquid organic vehicle). Incremental addition of catalyst to the reaction zone can be employed. If desired, the above procedure can be reversed, that is, the ethylenic reagent can be added to the reaction zone containing the catalyst (or a catalyst solution or suspension).

Unreacted ethylenic reagent and isomerized product can be recovered from the resulting reaction product mixture by conventional techniques such as by distilling said reaction product under reduced pressure.

The following examples are illustrative:

EXAMPLE 1

Vinylcyclohexene (1007 grams) and cobaltocene (50 grams) were charged to a three-liter stainless steel bomb and were maintained at 185° C. for fifteen hours. The resulting reaction product mixture was flash distilled and then carefully fractionated. There was obtained 232 grams of 1-ethyl-1,3-cyclohexadiene.

EXAMPLE 2

Nickelocene (1.65 grams) and 4-vinylcyclohexene (33 grams) were charged to a heavy-walled glass tube. The tube was sealed and then maintained at 180° C. for 18 hours. Flash distillation of the resulting reaction product mixture gave 19 grams of distillate. Vapor phase chromatography revealed that this was a mixture composed of 4-vinylcyclohexene, 1-ethyl-1,3-cyclohexadiene, and other components.

EXAMPLE 3

To a 500 milliliter bomb, there were charged 167 grams of 4-vinylcyclohexene and 10 grams of cyclopentadienyl cobalt 1-benzoylcyclopentadiene-1,3. The bomb then was heated to about 180° C. for 15 hours. Flash distillation of the resulting reaction product mixture yielded a complex mixture which contained 60 weight percent 1-ethyl-1,3-cyclohexadiene.

EXAMPLE 4

Nickelocene (1.75 grams) and 1,5-cyclooctadiene (35 grams) were charged to a heavy-walled glass tube. The tube was sealed and then maintained at 180° C. for eighteen hours. Flash distillation of the resulting reaction product mixture gave 23 grams of distillate. Vapor phase chromatography of a hearts cut (17 gms.; B.P. 210° C.; N 30/$d$ 1.4850) revealed that it was a mixture containing 85 weight percent 1,3-cyclooctadiene. Only a faint trace of 1,5-cyclooctadiene could be detected. The infrared spectrum of the crude reaction product was nearly identical to that of authentic 1,3-cyclooctadiene; B.P. 54° C./36 mm. of Hg, N 30/$d$ 1.4884.

The same isomerization reaction conducted at 130° C. for eighteen hours afforded 23 grams of distillate containing 18 weight percent 1,3-cyclooctadiene and 60 weight percent 1,5-cyclooctadiene.

EXAMPLE 5

The $PdCl_2 \cdot 2(C_6H_5CN)$ (1.75 grams) and 1,5-cyclooctadiene (35 grams) were charged to a heavy-walled glass tube. The tube was sealed and then maintained at 180° C. for 18 hours. At the end of this period of time the inside of the tube was coated with a metallic palladium mirror. Flash distillation of the resulting reaction product mixture yielded 14 grams of distillate. Vapor phase chromatography revealed that the distillate was 91.6 weight percent 1,3-cyclooctadiene.

EXAMPLE 6

The $PdCl_2 \cdot 2(C_6H_5CN)$ (15 grams) and 1,5-cyclooctadiene (300 grams) were charged to a 500 ml. flask and were refluxed for 4 hours under a nitrogen atmosphere. During this period of time the evolution of HCl gas could be detected both by odor and with litmus paper. The resulting solution itself darkened rapidly and deposited metallic palladium. Flash distillation of the resulting reaction product mixture gave 297 grams of distillate. Vapor phase chromatography revealed that the distillate was 87 weight percent 1,3-cyclooctadiene and about 10 weight percent 1,4-cyclooctadiene.

EXAMPLE 7

The $PdCl_2 \cdot 2(C_6H_5CN)$ (15 grams) and 1,5-cyclooctadiene (500 grams) were placed in a 500 ml. flask and were refluxed for 4 hours under a nitrogen atmosphere. Vapor phase chromatography revealed that the resulting reaction product mixture was composed of 80 weight percent 1,3-cyclooctadiene, 8 weight percent 1,5-cyclooctadiene, and 12 weight percent 1,4-cyclooctadiene.

EXAMPLE 8

To a heavy-walled glass tube, there were charged 35 grams of 1,5-cyclooctadiene and 1.75 grams of 1,5-cyclo- ---
[3] Organo-Metallic Compounds, by G. E. Coates, John Wiley and Sons, Inc., New York (1956); Chemical Reviews, volume 55, pages 551–594, The Williams and Wilkins Company, Baltimore (1955); McClellan et al., J. Am. Chem. Soc., 83, 1601 (1961).

octadiene palladium (II) chloride. The tube was sealed and then maintained at 180° C. for 18 hours. Flash distillation of the resulting reaction product mixture gave 25 grams of distillate. Vapor phase chromatography revealed that the distillate contained 92.2 weight percent 1,3-cyclooctadiene.

EXAMPLE 9

To a heavy-walled glass tube, there were charged 35 grams of 1,5-cyclooctadiene and 1.75 grams of bis(cyclopentadienyl) titanium dicarbonyl. The tube was sealed and then maintained at 180° C. for 18 hours. Flash distillation of the resulting reaction product mixture gave 23 grams of distillate. Vapor phase chromatography revealed that the distillate contained 51.6 weight percent 1,5-cyclooctadiene, 18.5 weight percent 1,3-cyclooctadiene, and 30 weight percent 1,4-cyclooctadiene.

EXAMPLE 10

To a heavy-walled glass tube, there were charged 35 grams of 1,5-cyclooctadiene and 1.75 grams of cyclopentadienyl cobalt 1 - benzoylcyclopentadiene-1,3. The tube was sealed and then maintained at a temperature of 180° C. for 18 hours. Flash distillation of the resulting reaction product mixture gave 28 grams of distillate. Vapor phase chromatography revealed that the distillate contained 1,3-cyclooctadiene.

EXAMPLE 11

The 1,5-cyclooctadiene (4 grams) and iron pentacarbonyl (0.2 ml.) were charged to a heavy-walled glass tube. The tube was sealed and then maintained at 150° C. for 18 hours. The catalyst was removed by filtration after cooling. Vapor phase chromatography revealed that the filtrate contained 50 weight percent 1,5-cyclooctadiene and 50 weight percent 1,3-cyclooctadiene.

EXAMPLE 12

Nickelocene (1.6 grams) and 4-methylcyclohexene (32 grams) were charged to a heavy-walled glass tube. The tube was then sealed and maintained at 185–192° C. for eighteen hours. Flash distillation of the resulting reaction product mixture gave 22 grams of distillate. This was chromatographed at 110° C. on a 100-foot capillary column coated with Apiezon "L."[4] The chromatogram exhibited the presence of two components; one with a retention time of 3.6 minutes (59 weight percent of the mixture), and the other with a retention time of 3.9 minutes (41 weight percent of the mixture). Under these same conditions, 4-methylcyclohexene has a retention time of 3.6 minutes and 1-methylcyclohexene has a retention time of 3.9 minutes.

EXAMPLE 13

Cobaltocene (1.6 grams) and 4-methylcyclohexene (32 grams) were charged to a heavy-walled glass tube. The tube was sealed and then maintained at 180° C. for 18 hours. Flash distillation of the resulting reaction product mixture gave 24 grams of distillate. This was chromatographed at 110° C. on a 100-foot capillary column coated with Apiezon "L." The chromatogram exhibited the presence of two components; one with a retention time of 3.6 minutes (83.4 weight percent of the mixture) and one with a retention time of 3.9 minutes (16.7 weight percent of the mixture), e.g., 1-methylcyclohexene.

EXAMPLE 14

A heavy walled glass tube was charged with 4 grams of 4-methylcyclohexene and 0.2 gram of $PdCl_2 \cdot 2\phi CN$. The tube was then sealed, heated to 150° C. and maintained thereat for five hours. The resulting reaction product mixture was chromatographed at 110° C. on a 100-foot capillary column coated with Apiezon "L." The

---

[4] A low vapor pressure grease which is useful in high vacuum work.

chromatogram exhibited the presence of two components; one with a retention time of 3.6 minutes and one with a retention time of 3.9 minutes, e.g., 1-methylcyclohexene.

EXAMPLE 15

A heavy walled glass tube was charged with 32 grams of vinylcyclohexane and 1.6 grams of $PdCl_2 \cdot 2\phi CN$. The tube was then sealed, heated to 180° C. and maintained at that temperature for 18 hours. Analysis of the resulting reaction product mixture indicated that over 70 weight percent of the vinylcyclohexane had been isomerized. The isomerized products still contained one double bond, but the vinyl group was no longer present in these isomerized products.

EXAMPLE 16

A heavy walled glass tube was charged with 4 grams of 1,5-cyclooctadiene and 0.2 gram of molybdenum hexacarbonyl. The tube was then sealed, heated to 250° C. and maintained at that temperature for 18 hours. Analysis of the resulting reaction product mixture by vapor phase chromatography revealed the presence of 52 weight percent 1,3-cyclooctadiene.

EXAMPLE 17

A heavy walled glass tube was charged with 4 grams of 1,5-cyclooctadiene and 0.2 gram of π-allyl palladium (II) chloride. The tube was then sealed, heated to 150° C., and maintained at that temperature for 3 hours. Analysis of the resulting reaction product mixture by vapor phase chromatography revealed it to be essentially pure 1,3-cyclooctadiene.

EXAMPLE 18

A heavy walled glass tube was charged with 4 grams of 1,5-cyclooctadiene and 0.2 gram of tungsten hexacarbonyl. The tube was then sealed, heated to 185° C., and maintained at that temperature for 18 hours. Analysis of the product by vapor phase chromatography revealed the presence of 1,3-, 1,4-, and 1,5-cyclooctadienes.

EXAMPLE 19

A heavy walled glass tube was charged with 2 grams of cyclopentadienyl manganese butadiene carbonyl $$C_5H_5Mn(C_4H_6)(CO)$$

20 ml. of n-heptane, and 20 ml. of butadiene. After sealing the tube, the solution was heated at 140° C. for 5 hours. The tube and contents were cooled to Dry Ice temperature and the tube opened. The contents were filtered to remove a small amount of precipitate. The filtrate was flash distilled at reduced pressure. The distillate was analyzed by vapor phase chromatography and found to contain, in addition to unreacted butadiene and solvent, about 60 weight percent of rearranged products of 4-vinylcyclohexene.

EXAMPLE 20

To 2,560 grams of refluxing 1,5-cyclooctadiene, there was added 12.8 grams of $PdCl_2 \cdot 2\phi_3P$. The resulting solution was refluxed under a nitrogen atmosphere for two hours. Analysis of the resulting reaction product mixture by vapor phase chromotography revealed the presence of 3.3 percent 1,3-, 73.7 percent 1,4- and 23.0 percent 1,5-cyclooctadiene.

EXAMPLE 21

A heavy walled glass tube was charged with 4 grams of 1,5-cyclooctadiene and 0.2 gram of 1,5-cyclooctadiene platinum (II) chloride. The tube was then sealed, heated to 180° C. and maintained at that temperature for 18 hours. Analysis of the resulting reaction product mixture by vapor phase chromatography revealed the presence of 18 percent 1,3-cyclooctadiene, 11 percent 1,4-cyclooctadiene and 71 percent 1,5-cyclooctadiene.

EXAMPLE 22

A heavy walled glass tube was charged with 4 grams of 1,5-cyclooctadiene and 0.2 gram of a ruthenium complex of 1,5-cyclooctadiene.[5] The tube was then sealed, heated to 180° C. and maintained at that temperature for 18 hours. Analysis of the resulting reaction product mixture by vapor phase chromatography revealed 92 percent 1,3-cyclooctadiene present therein.

EXAMPLE 23

A heavy walled glass tube was charged with 4 grams of 1,5-cyclooctadiene and 0.2 gram of rhodium-containing complex.[6] The tube was then sealed, heated to 180° C. and maintained at that temperature for 18 hours. Analysis of the resulting reaction product mixture by vapor phase chromatography revealed the presence of 17.4 percent 1,3-cyclooctadiene, 37.1 percent 1,4-cyclooctadiene, and 45.5 percent 1,5-cyclooctadiene.

EXAMPLE 24

To a flask equipped with a magnetic stirrer, there is added 40 grams of the olefinic compound vinylcyclohexane and 2.0 grams of $PdCl_2 \cdot 2\phi CN$. The contents of the flask are maintained at about 40° C. overnight. During this time appreciable amounts of C=C are shifted from the vinyl terminal position into the ring of the olefinic compound.

It is not intended that the above acts to limit the claims herein except to the extent provided by the claims.

What is claimed is:

1. An isomerization process which comprises contacting an ethylenically unsaturated compound at an elevated temperature in the presence of a catalytic amount of a transition metal catalyst and for a period of time sufficient to produce a shift in the position of the double bond of said ethylenically unsaturated compound; said compound being composed of hydrogen and carbon, a cycloaliphatic nucleus having up to 16 carbon atoms in said nucleus and at least one migratable ethylenic bond; said transition metal catalyst comprising a transition metal in one of its oxidation states capable of forming $d.sp.^2$ hybrid orbitals, said transition metal being furnished by a transition metal compound capable of forming a homogeneous phase with said ethylenically unsaturated compound and as such the transition metal compound represents said transition metal catalyst, and separating the resulting isomer.

2. A process which comprises contacting an ethylenically unsaturated compound, said compound being composed of hydrogen and carbon, a cycloaliphatic nucleus having up to 16 carbon atoms in said nucleus, and at least one isomerizable ethylenic bond; with a catalytic amount of a transition metal in one of its oxidation states capable of forming $d.sp.^2$ hybrid orbitals, said transition metal being furnished by a transition metal compound capable of forming a homogeneous phase with said ethylenically unsaturated compound; at an elevated temperature and for a period of time sufficient to produce a shift in the position of the double bond of said ethylenically unsaturated compound, and separating the resulting isomer.

---
[5] The ruthenium complex of 1,5-cyclooctadiene was prepared as follows: A solution of ruthenium trichloride (1 gram), 40 ml. of ethanol (100%) and 5 ml. of 1,5-cyclooctadiene was heated at 79° C. for 4.5 hours under a nitrogen atmosphere. Cooling to room temperature did not produce any solid. The solvent was removed in vacuum and the dark residue triturated with methyl cyclohexane. Filtration gave 980 milligrams of shiney black powder. Ananlysis.—Found: C, 21.04%; H, 3.93%; Ash, 40.94% (Ru, 31.13% if "ash" is $RuO_2$).

[6] The rhodium containing complex was prepared in the following manner: Bis(cycloocta-1,5-diene)-$\mu,\mu'$-dichlororhodium(I) (25 millimoles, 1.23 grams) was dissolved in 60 ml. $CH_2Cl_2$. The addition of 0.55 gram of benzonitrile did not produce any precipitate. The solvent was removed in a nitrogen stream. The residue was triturated with cyclohexane. The solid portion of the product was washed well with cyclohexane and dried under vacuum (1 mm. of Hg) for 3 hours; yield 1.025 grams; M.P. 215–222° (d.). Analysis.—Found: C, 39.07, 38.75%; H, 4.98, 4.82%; N, 6.10%; Rh, 43.90%.

---

3. A process which comprises contacting an isomerizable ethylenically unsaturated hydrocarbon selected from the group consisting of (a) cycloolefins having from 2 to 3 ethylenic bonds, (b) alkyl substituted cycloolefins having from 1 to 3 ethylenic bonds, (c) vinyl substituted cycloolefins having from 1 to 3 endocyclic-ethylenic bonds, and (d) vinyl substituted cycloalkanes, said ethylenically unsaturated hydrocarbons containing not more than 16 carbon atoms in the cycloaliphatic nucleus thereof; with a catalytic amount of a transition metal in one of its oxidation states capable of forming $d.sp.^2$ hybrid orbitals, said transition metal being furnished by a transition metal compound capable of forming a homogeneous phase with said ethylenically unsaturated hydrocarbon; at an elevated temperature; and for a period of time sufficient to produce a shift in the position of the double bond of said isomerizable ethylenically unsaturated compound, and separating the resulting isomer.

4. The process of claim 3 wherein said transition metal is a Group VIII metal.

5. The process of claim 3 wherein said transition metal is a Group VIIB metal.

6. The process of claim 3 wherein said transition metal is a Group VIB metal.

7. The process of claim 3 wherein said transition metal is a Group VB metal.

8. The process of claim 3 wherein said transition metal is a Group IVB metal.

9. The process of claim 3 wherein said transition metal is iron.

10. The process of claim 3 wherein said transition metal is cobalt.

11. The process of claim 3 wherein said transition metal is nickel.

12. The process of claim 3 wherein said transition metal is ruthenium.

13. The process of claim 3 wherein said transition metal is rhodium.

14. The process of claim 3 wherein said transition metal is palladium.

15. The process of claim 3 wherein said transition metal is iridium.

16. The process of claim 3 wherein said transition metal is osmium.

17. The process of claim 3 wherein said transition metal is platinum.

18. A process which comprises contacting an isomerizable cyclodiolefinic hydrocarbon having up to 12 carbon atoms in the cycloaliphatic nucleus, with from about 0.005 to about 8 weight percent, based on the weight of said hydrocarbon, of a Group VIII transition metal in an oxidation state capable of forming $d.sp.^2$ hybrid orbitals, said transition metal being furnished by a transition metal compound capable of forming a homogeneous phase with said hydrocarbon; at a temperature in the range of from about 25° C. to about 225° C.; and for a period of time sufficient to produce a shift in the position of the double bond of said hydrocarbon, and separating the resulting isomer.

19. A process which comprises contacting an isomerizable alkyl substituted cyclomonoolefinic hydrocarbon having up to 12 carbon atoms in the cycloaliphatic nucleus, with from about 0.005 to about 8 weight percent, based on the weight of said hydrocarbon, of a Group VIII transition metal in an oxidation state capable of forming $d.sp.^2$ hybrid orbitals, said transition metal being furnished by a transition metal compound capable of forming a homogeneous phase with said hydrocarbon; at a temperature in the range of from about 25° C. to about 225° C.; and for a period of time sufficient to produce a shift in the position of the double bond of said hydrocarbon, and separating the resulting isomer.

20. A process which comprises contacting an isomerizable alkyl substituted cyclodiolefinic hydrocarbon having up to 12 carbon atoms in the cycloaliphatic nucleus, with from about 0.005 to about 8 weight percent, based on the weight of said hydrocarbon, of a Group VIII transition metal in an oxidation state capable of forming d.sp.$^2$ hybrid orbitals, said transition metal being furnished by a transition metal compound capable of forming a homogeneous phase with said hydrocarbon; at a temperature in the range of from about 25° C. to about 225° C.; and for a period of time sufficient to produce a shift in the position of the double bond of said hydrocarbon, and separating the resulting isomer.

21. A process which comprises contacting an isomerizable vinyl substituted cyclomonoolefinic hydrocarbon having up to 12 carbon atoms in the cycloaliphatic nucleus, with from about 0.005 to about 8 weight percent, based on the weight of said hydrocarbon, of a Group VIII transition metal in an oxidation state capable of forming d.sp.$^2$ hybrid orbitals, said transition metal being furnished by a transition metal compound capable of forming a homogeneous phase with said hydrocarbon; at a temperature in the range of from about 25° C. to about 225° C.; and for a period of time sufficient to produce a shift in the position of the double bond of said hydrocarbon, and separating the resulting isomer.

22. A process which comprises contacting an isomerizable vinylcycloalkane having up to 12 carbon atoms in the cycloaliphatic nucleus, with from about 0.005 to about 8 weight percent, based on the weight of said hydrocarbon, of a Group VIII transition metal in an oxidation state capable of forming d.sp.$^2$ hybrid orbitals, said metal being furnished by a transition metal compound capable of forming a homogeneous phase with said vinylcycloalkane; at a temperature in the range of from about 25° C. to about 225° C.; and for a period of time sufficient to produce a shift in the position of the double bond of said vinylcycloalkane, and separating the resulting isomer.

23. A process for the preparation of cyclooctadiene-1,3 comprising heating cyclooctadiene-1,5 at an isomerizing temperature with a catalytic amount of a palladium chloride catalyst, and separating cyclooctadiene-1,3 from the resulting reaction mixture.

No references cited.

DELBERT E. GANTZ, *Primary Examiner.*

V. O'KEEFE, *Assistant Examiner.*